US011523017B2

(12) United States Patent
Sato (10) Patent No.: US 11,523,017 B2
(45) Date of Patent: Dec. 6, 2022

(54) PARAMETER-BASED DETERMINATION OF A PROCESSING REGION CUT FROM AN ORIGINAL REGION EXTRACTED FROM A READ IMAGE

(71) Applicant: CANON KABUSHIKI KAISHA, Tokyo (JP)

(72) Inventor: Junki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/373,183

(22) Filed: Jul. 12, 2021

(65) Prior Publication Data

US 2022/0038594 A1    Feb. 3, 2022

(30) Foreign Application Priority Data

Jul. 29, 2020 (JP) .............................. JP2020-128474

(51) Int. Cl.
*H04N 1/00* (2006.01)

(52) U.S. Cl.
CPC ..... *H04N 1/00803* (2013.01); *H04N 1/00005* (2013.01); *H04N 1/00034* (2013.01); *H04N 1/00037* (2013.01); *H04N 1/00816* (2013.01)

(58) Field of Classification Search
None
See application file for complete search history.

(56) References Cited

U.S. PATENT DOCUMENTS

| 7,830,543 | B2 * | 11/2010 | Maki | H04N 1/2158 |
| | | | | 358/1.18 |
| 11,165,922 | B2 * | 11/2021 | Sunada | H04N 1/3878 |
| 2009/0147298 | A1 * | 6/2009 | Takahashi | H04N 1/3935 |
| | | | | 358/1.15 |

FOREIGN PATENT DOCUMENTS

JP    2002-010059    1/2002

* cited by examiner

*Primary Examiner* — Scott A Rogers
(74) *Attorney, Agent, or Firm* — Venable LLP (57) ABSTRACT

There are provided an image processing apparatus, an image processing method, and a storage medium which are capable of obtaining an image expected by a user. To this end, for an original region on an inner side, the original region is set by using a parameter corresponding to the original region on the inner side. For an original region on an outer side including an outer edge, the original region is set by using a parameter corresponding to the original region on the outer side.

21 Claims, 5 Drawing Sheets

PARAMETER-BASED DETERMINATION OF A PROCESSING REGION CUT FROM AN ORIGINAL REGION EXTRACTED FROM A READ IMAGE

BACKGROUND

Field

The present disclosure relates to an image processing apparatus, an image processing method, and a storage medium, which are configured to extract and read an original region of an original placed on an original table, and to save or print an image thus read.

Description of the Related Art

There has been known a technique for detecting a position on an original placed on an original table and saving and printing an image. Japanese Patent Laid-Open No. 2002-10059 discloses a concept of detecting a position on an original regarding an image to be read out of the original by using a method such as edge extraction.

In reading the original, if an original is relatively thick like a photograph, the thickness may form a shade around the original and an original region estimated by a method such as edge extraction is wider than the actual original region due to an effect of the shade. For this reason, a desired image can be obtained by setting a region reduced inward as compared to the estimated original region with the shade taken into account. However, in a case of reading a photograph original with margins on the periphery (hereinafter referred to as a bordered photograph), there is a problem that an image expected by a user cannot be obtained if processing that takes an effect of the shade into account is carried out.

SUMMARY

Given the situation, the present disclosure provides an image processing apparatus, an image processing method, and a storage medium which are capable of obtaining an image expected by a user.

To this end, an image processing apparatus according to an aspect of the present disclosure includes a reading unit configured to read an image on an original, an extraction unit configured to extract an original region of the image read by the reading unit, a judgment unit configured to judge an inclusive relation of the original region extracted by the extraction unit, a determination unit configured to determine a processing region to be cut out of the original region extracted by the extraction unit by using a prescribed parameter, and a switching unit configured to switch the parameter based on a judgment result by the judgment unit.

According to the present disclosure, it is possible to provide an image processing apparatus, an image processing method, and a storage medium which are capable of obtaining an image expected by a user.

Further features of the present disclosure will become apparent from the following description of exemplary embodiments with reference to the attached drawings.

DESCRIPTION OF THE EMBODIMENTS

The problem of the processing while taking the effect of the shade into account in the case of reading the photograph original with the margins on the periphery (hereinafter referred to as a bordered photograph) will be supplementarily described. Two regions are detected in the case of reading the bordered photograph, namely, an estimated region based on edges at ends of the photograph original, and an estimated region based on edges of a portion on an inner side of margins, that is, an actual image portion. On the edges at the ends of the photograph original, a shade is formed around the original as discussed earlier. A desired image can therefore be obtained by setting a region reduced inward. However, no shades are formed on the edges of the image portion. Accordingly, if a region reduced inward is set as with the case of the edges on at the ends of the photograph original, the end portions of the image will be discarded and an image expected by a user cannot be obtained. The following embodiment will describe an example in which an image expected by a user can be obtained in the case where processing that takes an effect of a shade into account is applicable.

First Embodiment

A first embodiment of the present disclosure will be described below with reference to the drawings.

Figure 1:
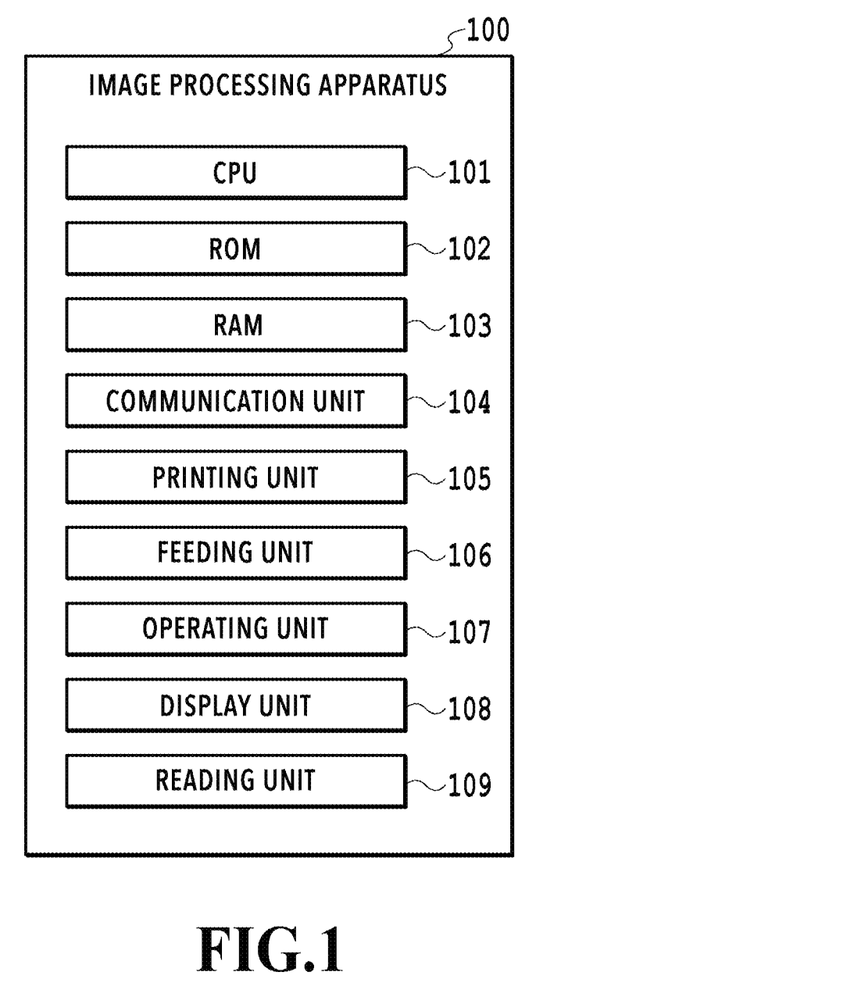
FIG. 1 is a block diagram illustrating a configuration of an image processing apparatus.

FIG. 1 is a block diagram illustrating a configuration of an image processing apparatus 100 to which this embodiment is applicable. The image processing apparatus 100 reads an original placed on an original table with a reading unit 109, and either saves or prints the read image. The image processing apparatus 100 is configured to be capable of reading multiple originals placed on the original table. The image processing apparatus 100 includes a CPU 101, a ROM 102, a RAM 103, a communication unit 104, a printing unit 105, a feeding unit 106, an operating unit 107, a display unit 108, and the reading unit 109. The operating unit 107 may include keys, for example, or may be integrated with the display unit 108 as a touch panel. The CPU 101 implements various functions that can be executed by the image processing apparatus 100 by loading programs stored in the ROM 102 into the RAM 103. The reading unit 109 is a color scanner adopting either a CCD method or a CID method, which reads a silver halide photograph, a magazine, or the like as image data (digital data).

Figure 2:
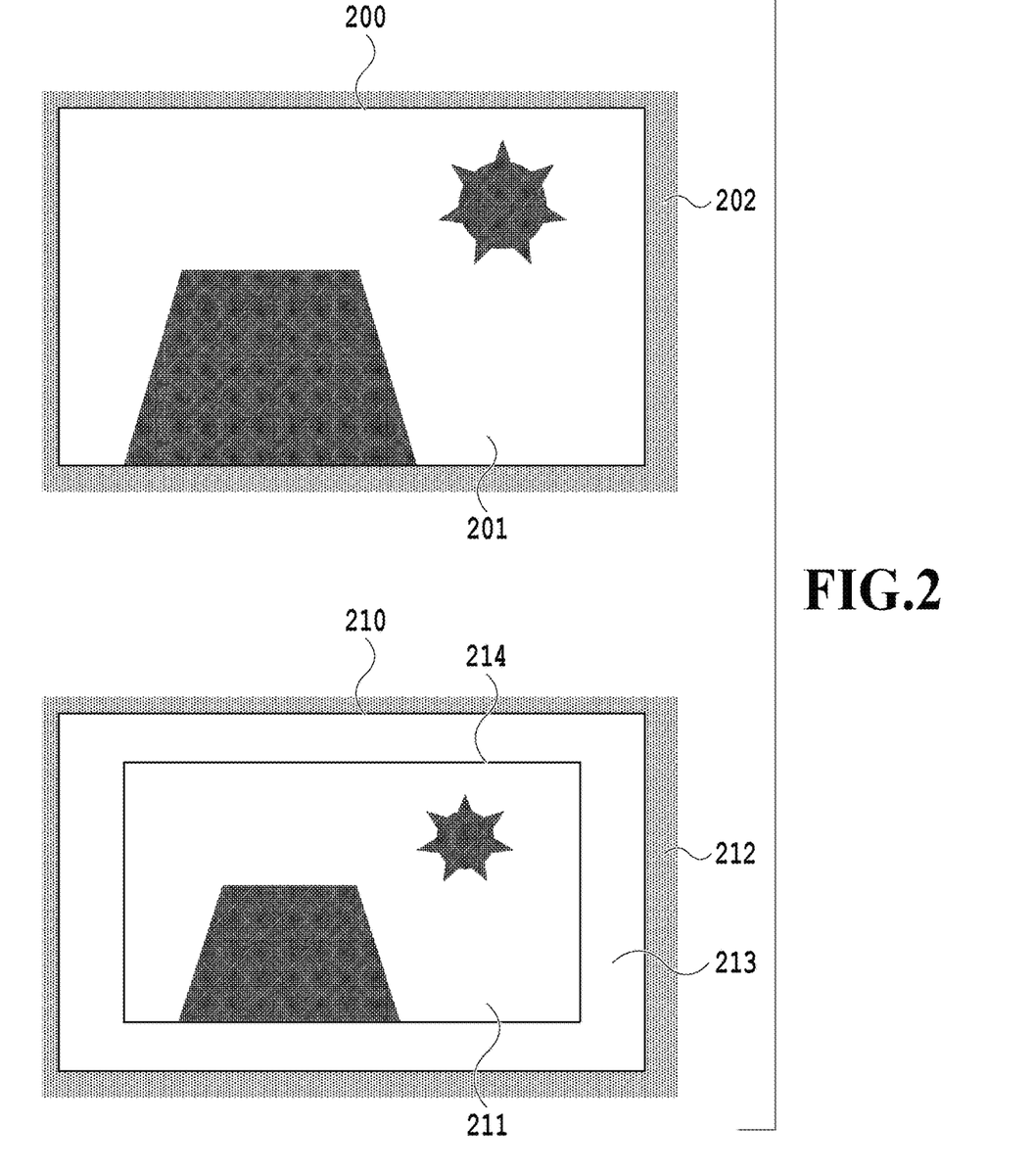
FIG. 2 is a diagram illustrating a borderless photograph and a bordered photograph which are photograph originals to be read.

FIG. 2 is a diagram illustrating a borderless photograph 200 and a bordered photograph 210 which are photograph originals to be read. Since the photograph originals are generally thick, shades 202 and 212 may be formed on the periphery of the end portions of the original in the case where the original is read with the image formation apparatus. In the case where the shade is formed around the read original, and the original region is detected, then an estimated original region candidate is a rectangle including the shade. Accordingly, taking the effect of the shade into account in order to eliminate the shaded region, a portion on an inner side of the rectangle of the estimated original region candidate is defined as the original region. This makes it possible to obtain the original region excluding the shade.

In the event of copying the bordered photograph 210, there are a case of copying the bordered photograph 210 including a border 213 on the periphery and a case of copying only an image portion 211 without including the border 213 on the periphery. Both of the case of copying the bordered photograph 210 including the border 213 on the periphery and a case of reading the borderless photograph 200 as the original involve outer edge end portions of the originals and are prone to form shades around the originals. For this reason, original region detection processing to cut out an inner side of the rectangle of the original region candidate by using predetermined cutout parameters may be carried out in the case of including the border 213 around the bordered photograph 210 and in the case of reading the borderless photograph 200 as the original.

On the other hand, in a case of not including the border 213 on the periphery at the time of copying the bordered photograph 210, it is necessary to cut out the inner side of a boundary 214 between the image portion 211 and the border 213 on the periphery appropriately as the original region. In the case of reading the bordered photograph 210, two regions of a rectangular region including the shade 212 and a rectangular region defined by the boundary 214 become the original region candidates. Accordingly, in the case of not including the border 213, the original region candidate being the rectangular region including the shade 212 on an outer side is excluded and the original region being the rectangular region defined by the inner side of the boundary 214 is retained.

Here, the rectangular region defined by the boundary 214 on the inner side does not involve the outer edge end portion of the original and does not form the shade due to the thickness of the original. For this reason, if the original region detection processing is carried out while taking the effect of shade into account as with the case of including the border 213 on the periphery and the case of reading the borderless photograph 200, part of the necessary region of the image portion 211 may be discarded and the image expected by a user cannot be obtained.

Given the situation, in the case of copying the original region on the inner side without including the border 213 on the periphery at the time of copying the bordered photograph 210, the original region detection processing is carried out in this embodiment by using cutout parameters having smaller values than the predetermined cutout parameters applicable to the original region candidate on the outer side. In other words, it is consequently possible to obtain an original which is larger than that obtained by the original region detection processing which takes the effect of the shade into account. Thus, the image expected by the user can be obtained.

Figure 3:
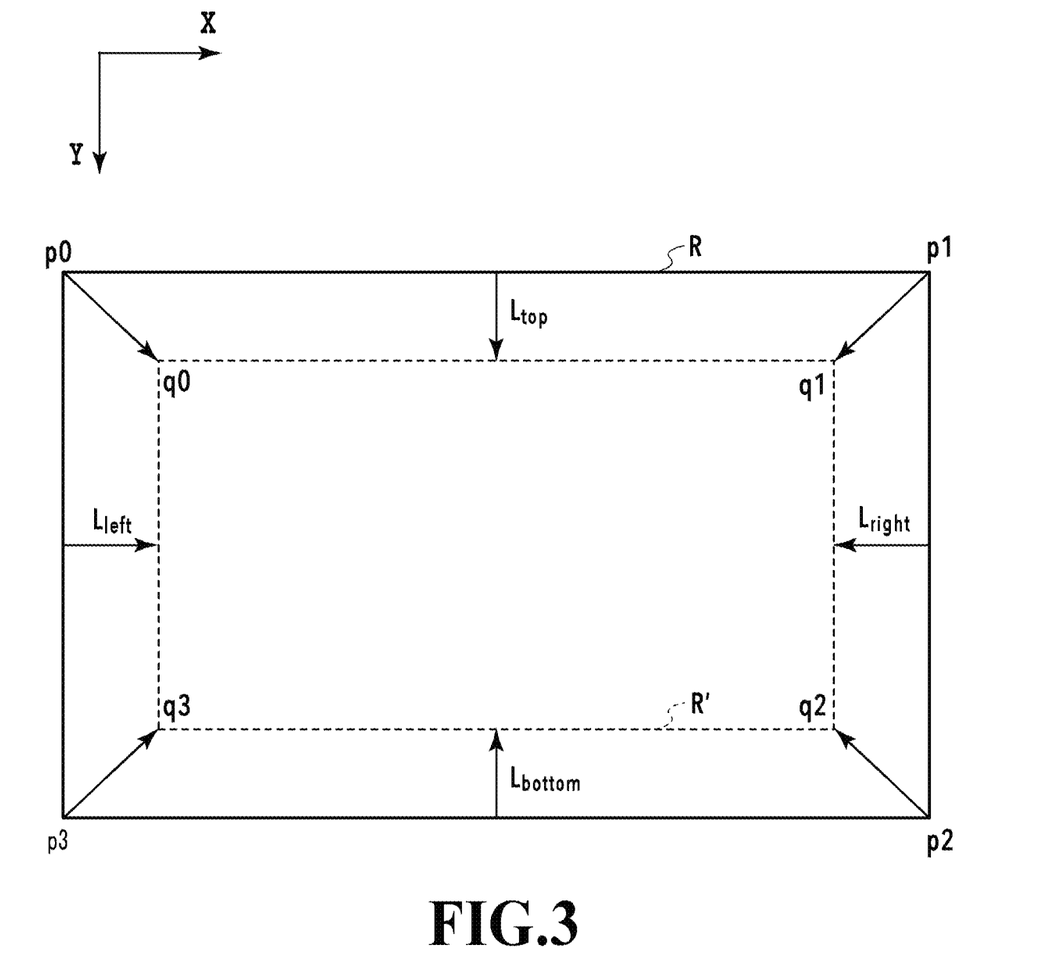
FIG. 3 is a schematic diagram illustrating how cutout processing is performed.

FIG. 3 is a schematic diagram illustrating how cutout processing is performed. A description will be given of a case of performing the cutout processing on an original region candidate. In the case of defining the cutout parameters as (Ltop, Lbottom, Lleft, and Lright), the respective sides of the rectangle of the original region candidate are cut out at positions shifted vertically and horizontally inward by values of Ltop, Lbottom, Lleft, and Lright. An original region candidate R is assumed to be expressed as a rectangle p0, p1, p2, and p3. The point shifted from the point p0 by the value Lleft in the X direction and by the value Ltop in the Y direction is defined as a point q0. Likewise, the point shifted from the point p1 by the values (−Lright and Ltop) is defined as a point q1, the point shifted from the point p2 by the values (−Lright and −Lbottom) is defined as a point q2, and the point shifted from the point p3 by the values (Lleft and −Lbottom) is defined as a point q3. An original region R' cut out of the original region candidate R can be expressed as a rectangle q0, q1, q2, and q3.

FIG. 3 illustrates a case where the rectangle of the original region candidate is not inclined relative to the X axis or the Y axis. In the case where the rectangle of the original region candidate is inclined relative to the X axis or the Y axis, corrections corresponding to the inclination for the cutout parameters may be calculated to cut out the original region.

As described above, the cutout parameters are set as the cutout parameters for the original region candidate R on the outer side and as the cutout parameters for the original region candidate on the inner side (where the cutout parameters for the original region candidate on the outer side>the cutout parameters for the original region candidate on the inner side). Then, the original region detection processing is carried out by using the cutout parameters thus set. Here, the sets of the cutout parameters may be set as predetermined values in conformity to characteristics of the image processing apparatus 100 or may use values set individually by the user or values selected by the user from values registered in advance.

Figure 4:
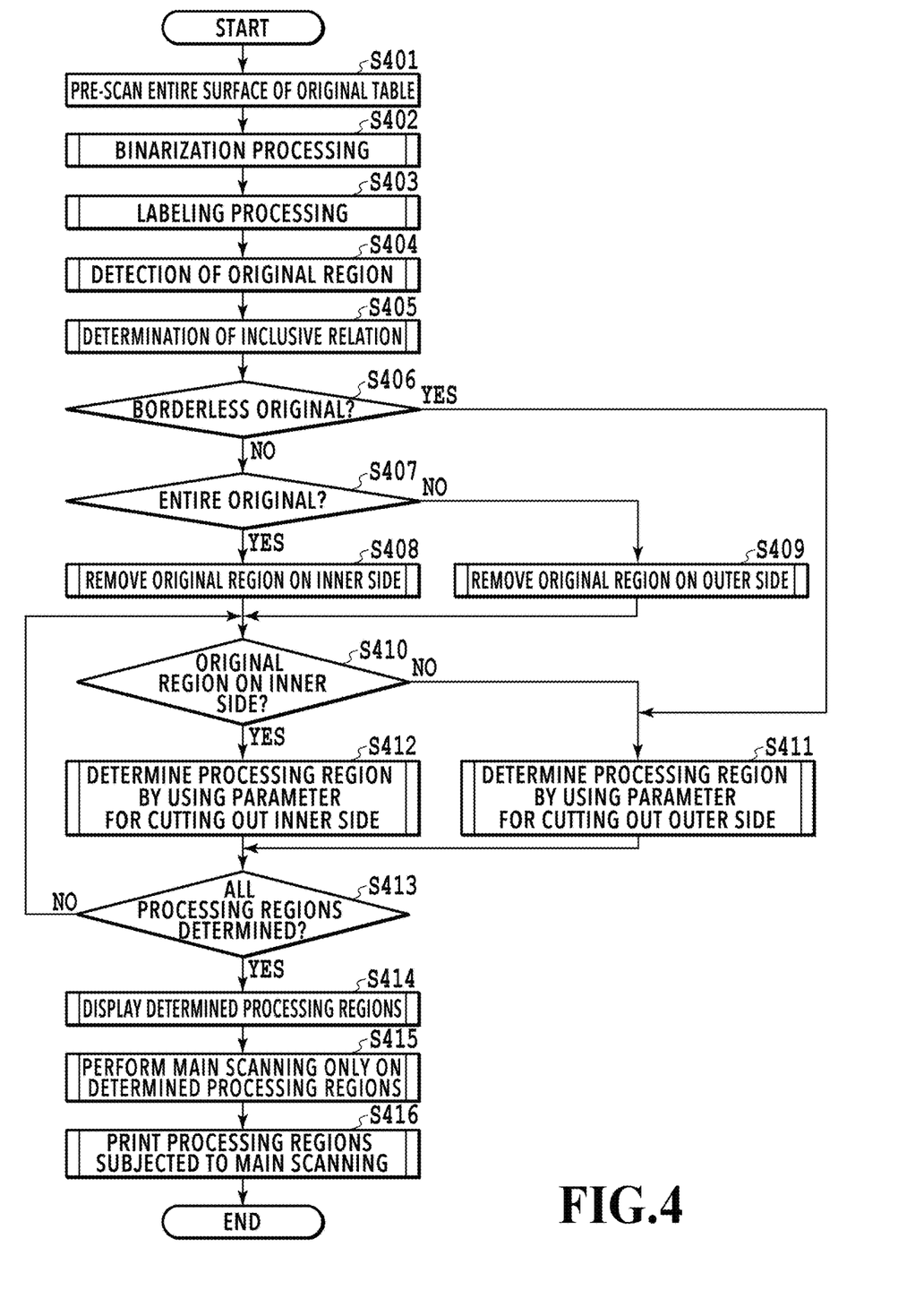
FIG. 4 is a flowchart illustrating reading and printing processing.

FIG. 4 is a flowchart illustrating reading and printing processing of this embodiment. Now, the reading and printing processing of this embodiment will be described below by using this flowchart. A series of processes illustrated in FIG. 4 is carried out by the CPU 101 of the image processing apparatus 100 loading program codes stored in the ROM 102 into the RAM 103 and executing the program codes. Alternatively, part or all of the functions of the steps in FIG. 4 may be implemented by hardware such as an ASIC and an electronic circuit. Note that code "S" associated with explanations of each process means a step in the flowchart.

As the reading and printing processing is started, the CPU 101 firstly performs pre-scanning of the entire surface of the original table based on RGB colors and at a resolution of 75 dpi in accordance with an operation of the user in S401. Although the resolution is set to 75 dpi herein, the reading may be conducted at a different resolution depending on specifications of a reading sensor used in the image processing apparatus 100. Here, it is preferable to conduct the reading at a lower resolution than the resolution at a main reading (main scanning) to be described later in order to speed up analysis processing in detecting the original region.

Thereafter, in S402, the CPU 101 carries out binarization processing on the read image obtained in S401. In the binarization processing, binarization is conducted by using publicly known techniques including filtering processing such as edge extraction, threshold processing using the values of brightness and color difference, and so forth. Then, in S403, the CPU 101 carries out labeling processing on the binary image data obtained in the binarization processing. In the labeling processing, an image in the binary image data including continuous black pixels is provided with a label number. In this instance, each pixel of the continuous black pixels is provided with the same label number and a cluster of the black pixels provided with the same label number is referred to as a labeled image. If the number of continuous black pixels is equal to or below a predetermined number in the labeling processing, the cluster of the black pixels is treated as a noise and excluded from the subsequent processing.

Then, in S404, the CPU 101 carries out the original region detection processing on the obtained labeled images. In the original region detection processing, from the labeled images, rectangles that surround the labeled images are set and the locations of the peaks and the inclination angles of the rectangles are stored as original region candidates. A method using publicly known techniques such as the Snake method can be thought as the method of setting each rectangle. In the case of the bordered photograph original, an outer side region of the rectangle defined by the edges of the photograph original ends and a rectangular inner side region obtained by removing the border formed at the edges of the image portion are detected, for example. Thereafter, in S405, the CPU 101 selects the two of the original region candidates thus obtained and carries out inclusive relation determination processing to investigate an inclusive relation. In the inclusive relation determination processing, if one of the selected two original region candidates is completely included in the other region, then the CPU 101 stores information indicating that the original region candidate on the inner side is located on the inner side (hereinafter referred to as inclusive relation information).

In S406, the CPU 101 determines, based on the stored inclusive relation information, whether or not the read original is a borderless original (original determination). Note that the borderless original stated herein is the borderless photograph 200 described with reference to FIG. 2. Like the borderless photograph 200, the borderless original means an original that does not include a border of the image which is different from the border on the outer periphery (margins). In other words, an original that includes the border of the image that is different from the border on the outer periphery is determined to be not a borderless original (determined to be a bordered original) even if there is no border (the margins) at an outer peripheral portion of the original. If the original is not the borderless original (N), the processing proceeds to S407. If the original is the borderless original (Y), the processing proceeds to S411.

In the case where the processing proceeds to S407, the CPU 101 determines which one of the two original region candidates in the inclusive relation is to be removed. Here, the determination is made based on whether or not the entire original is designated or the included image is designated as a reading target in setting by the user in advance. Specifically, the inner side region being the rectangle defined by edges of the included image portion is removed in the case where the entire original is designated, and the outer side region being the rectangle defined by edges of the outer edges of the original is removed in the case where the included image is designated. As described above, the processing to determine the original region is changed depending on the result of determination as to whether the entire original is designated or the included image is designated. Here, the determination as to which one is to be removed may be automatically carried out by presetting conditions such as the lengths of the sides, the ratio of the areas, and the like of the two original region candidates.

After the above-described determination, the CPU 101 proceeds to S408 in the case where the determination turns out to be the entire original (Y) and removes the original region candidate on the inner side. On the other hand, the CPU 101 proceeds to S409 in the case where the determination turns out to be not the entire original (N) and removes the original region candidate on the outer side. Thus, the single original region candidate is specified (determined) out of the two original region candidates in the inclusive relation.

Thereafter, in S410, the CPU 101 refers to the inclusive relation information stored in S405 and determines whether or not the retained original region candidate is the original region on the inner side.

In this embodiment, in the case where the retained original region candidate is the outer side region, a processing region is determined by cutting out the rectangle of the original region candidate reduced inward by using the parameters for cutting out the outer side in order to eliminate the effect of the shade due to the thickness of the original. On the other hand, in the case where the retained original region candidate is the inner side region, the processing region is determined (region determination) by cutting out the rectangle of the original region candidate by using the parameters for cutting out the inner side (with a less amount of cutout) different from the parameters for cutting out the outer side since there is no effect of the shade due to the thickness of the original. Thus, it is possible to obtain the image expected by the user even in the case where the original region is located on the inner side of the edges of the image portion without cutting out the end portions of the image more than required.

In the case of the determination of the original region on the outer side in S410, the CPU 101 proceeds to S411 and determines the processing region by cutting out the rectangle of the original region candidate by using the parameters for cutting out the outer side. On the other hand, in the case of the determination of the original region on the inner side in S410, the CPU 101 proceeds to S412 and determines the processing region by cutting out the rectangle of the original region candidate by using the parameters for cutting out the inner side.

Thereafter, in S413, the CPU 101 repeats the processing from S410 to either S411 or S412 until the processing regions in all the originals placed on the original table are determined. After the processing regions in all the originals are determined, the CPU 101 cuts out the originals in S414 from the images on the entire surface of the original table obtained by the pre-scanning, using the determined processing regions, and displays the cut out images on the display unit 108. The user can check the cut out images on the display unit 108. In the case where the user determines that the processing regions are obtained as expected and the user presses an execution button on the operating unit 107, the CPU 101 executes the main scanning of the determined processing regions in S415. Thereafter, in S416, the CPU 101 prints the processing region data obtained by the main scanning. Here, part of the images on the originals designated by the user out of the images displayed in S414 may be subjected to the main scanning and printed.

Here, in the case of detection of inclination of the original relative to a prescribed reference direction in the original region detection processing in S404, the processing region may be determined in S411 by using parameters for the outer side according to the detected inclination. This processing is carried out to determine the original region by using the parameters according to the inclination because the magnitude of the shade formed on the outer edge of the original for the case where the original is inclined is different from that in the case where the original is not inclined.

As described above, the processing region in the original region on the inner side is determined by using the parameters corresponding to the original region on the inner side while the processing region in the original region on the outer side (inclusive of the outer edge) is determined by using the parameters corresponding to the original region on the outer side. This makes it possible to provide the image processing apparatus, the image processing method, and the program which are capable of obtaining the image expected by the user.

Second Embodiment

A second embodiment of the present disclosure will be described below. Note that a basic configuration of this embodiment is the same as that of the first embodiment and the following description will therefore be focused on characteristic features of this embodiment.

According to the first embodiment, in the case where a bordered photograph 210 is read, and there are the original region candidate of the rectangular region including the shade and the original region candidate of the rectangular region defined by the boundary of the image, the determination as to which one of the original region candidates is to be removed is made by way of the determination as to whether or not the entire original is to be read.

In this embodiment, in a case where lengths of sides of the rectangles of the respective original region candidates are compared and then a determination is made to retain an original region candidate preset by a user if a result of comparison exceeds a predetermined ratio. To be more precise, a length of a long side (or a short side) of the rectangular region including the shade is compared with a length of a long side (or a short side) of the rectangular region defined by the image boundary. Then, the original region candidate of the rectangular region including the shade is adopted in the case where the length of the long side (or the short side) of the rectangular region defined by the image boundary is less than 70% of the length of the long side (or the short side) of the rectangular region including the shade, for example. Alternatively, the determination as to which one of the original regions is to be retained may be made by comparing areas of the regions instead of the lengths of the sides thereof.

In this way, in a case of copying a business card with a face photograph, for example, it is possible to copy the entire business card, not determining a portion of the face photograph on the inner side as the processing region.

Third Embodiment

A third embodiment of the present disclosure will be described below with reference to the drawing. Note that a basic configuration of this embodiment is the same as that of the first embodiment and the following description will therefore be focused on characteristic features of this embodiment.

In the first embodiment and the second embodiment, the cutout parameters are changed depending on whether or not the original region candidate is the region on the inner side, and the main scanning is carried out after the determination of the processing region. In this embodiment, the processing region is not cut out before the main scanning. Instead, the main scanning of the original region candidates is carried out and then the obtained original region is cut out. In other words, the main scanning is carried out before the determination of the processing region. Regarding an amount of cutout relative to the image subjected to the main scanning, the determination as to which set of the cutout parameters on the inner side and the outer side is to be used is made by referring to the inclusive relation information on the original region candidates. In this case, the amount of cutout may be changed in accordance with a reading resolution at the time of the main scanning.

Figure 5:
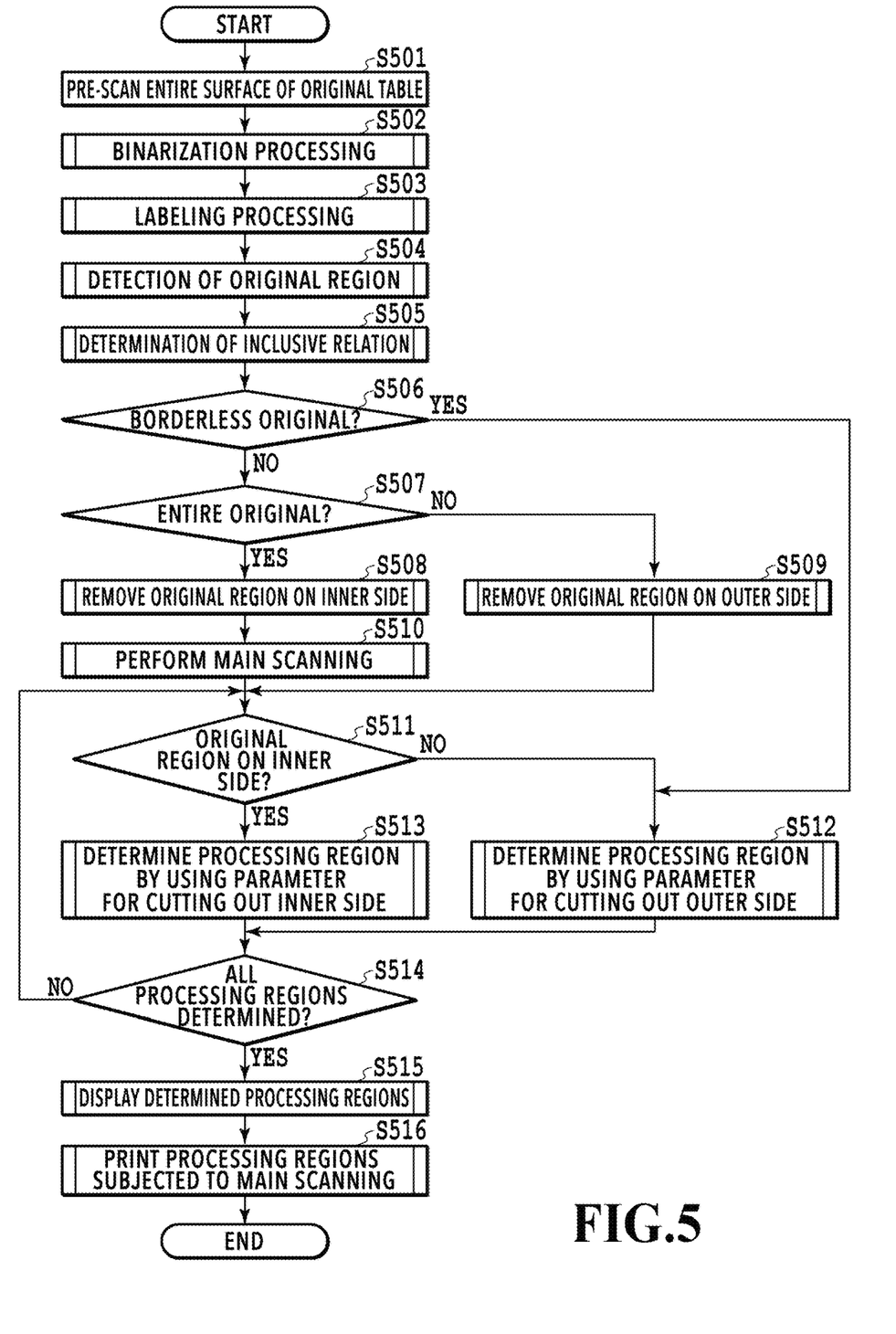
FIG. 5 is a flowchart illustrating reading and printing processing.

FIG. 5 is a flowchart illustrating reading and printing processing of this embodiment. Now, the reading and printing processing of this embodiment will be described below by using this flowchart. Note that the agent of processing in the reading and printing processing is the CPU 101 unless otherwise specified.

The timing to carry out the main scanning in the reading and printing processing of this embodiment is different from that in the reading and printing processing of the first embodiment described with reference to FIG. 4. The processing from S501 to S508 or S509 is the same as the processing from S401 to S408 or S409 in the first embodiment, and the description thereof will be omitted.

In this embodiment, the CPU 101 carries out the main scanning in S510 after the processing in S508 or S509. At this point, the processing region by using the parameters has not been cut out yet. In other words, in this embodiment, the processing region is cut out by using the parameters after carrying out the main scanning. The reading and printing processing may be carried out in this way.

The processing from S511 to S516 subsequent to S510 is the same as the processing from S410 to S416 of the first embodiment.

The present disclosure can also be realized by processing to supply a program to implement one or more functions of the above-described embodiments to a system or an apparatus through a network or a storage medium, and to cause one or more processors of a computer in the system or the apparatus to read and execute the program. Alternatively, the present disclosure can also be realized by using a circuit (such as an ASIC) that implements the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-128474 filed Jul. 29, 2020, which is hereby incorporated by reference wherein in its entirety.

What is claimed is:

1. An image processing apparatus comprising:
a reading unit configured to read an image on an original;
an extraction unit configured to extract an original region of the image read by the reading unit; and
a determination unit configured to determine a processing region to be cut out of the original region using a parameter determined based on an inclusive relation of the original region extracted by the extraction unit,
wherein in a first case where a target to be subjected to prescribed image processing is an included image, the parameter to be used to determine the processing region is a first parameter to cut out the original region larger than the original region to be cut out in a second case where the target to be subjected to the prescribed image processing is the entire original, and
wherein in the second case where the target to be subjected to the prescribed image processing is the entire original, the parameter to be used to determine the processing region is a second parameter, and the first parameter is based on the second parameter.

2. The image processing apparatus according to claim 1, further comprising
an original determination unit configured to judge whether or not the original to be read is a borderless original, wherein
in a case where a result of the determination by the original determination unit turns out to be the borderless original, the determination unit determines the processing region by using the second parameter.

3. The image processing apparatus according to claim 1, wherein
the reading unit reads the original placed on an original table, and
in a case where the original region extracted by the extraction unit is inclined relative to a reference direction of the original table, the determination unit determines the processing region by using the second parameter according to the inclination of the original region.

4. The image processing apparatus according to claim 1, wherein the reading unit carries out
pre-scanning to read the original at a start of processing, and
main scanning to read the original.

5. Image processing apparatus according to claim 4, wherein a resolution in a case of carrying out the pre-scanning is lower than a resolution in a case of carrying out the main scanning.

6. The image processing apparatus according to claim 4, wherein the main scanning is carried out after determination of the processing region by the determination unit.

7. The image processing apparatus according to claim 4, wherein the main scanning is carried out before determination of the processing region by the determination unit.

8. The image processing apparatus according to claim 1, wherein the inclusive relation is determined by comparing a length of a short side of the original region extracted by the extraction unit to a length of a long side of the original region extracted by the extraction unit.

9. The image processing apparatus according to claim 1, wherein the inclusive relation is determined by comparing areas of two original region candidates extracted by the extraction unit.

10. The image processing apparatus according to claim 1, wherein the reading unit is capable of reading images on a plurality of the originals.

11. An image processing method comprising:
reading an image on an original placed on an original table;
extracting an original region of the read image; and
determining a processing region to be cut out of the original region extracted using a parameter determined based on an inclusive relation of the extracted original region,
wherein in a first case where a target to be subjected to prescribed image processing is an included image, the parameter to be used to determine the processing region is a first parameter to cut out the original region larger than the original region to be cut out in a second case where the target to be subjected to the prescribed image processing is the entire original, and
wherein in the second case where the target to be subjected to the prescribed image processing is the entire original, the parameter to be used to determine the processing region is a second parameter, and the first parameter is based on the second parameter.

12. A non-transitory computer-readable storage medium storing a program to be executed by an image processing apparatus to implement:
a reading unit configured to read an image on an original;
an extraction unit configured to extract an original region of the image read by the reading unit; and
a determination unit configured to determine a processing region to be cut out of the original region extracted using a parameter determined based on an inclusive relation of the extracted original region,
wherein in a first case where a target to be subjected to prescribed image processing is an included image, the parameter to be used to determine the processing region is a first parameter to cut out the original region larger than the original region to be cut out in a second case where the target to be subjected to the prescribed image processing is the entire original, and
wherein in the second case where the target to be subjected to the prescribed image processing is the entire original, the parameter to be used to determine the processing region is a second parameter, and the first parameter is based on the second parameter.

13. The non-transitory computer-readable storage medium according to claim 3 storing the program to be executed by the image processing apparatus to further implement:
an original determination unit configured to judge whether or not the original to be read is a borderless original, wherein
in a case where a result of the determination by the original determination unit turns out to be the borderless original, the determination unit determines the processing region by using the second parameter.

14. The non-transitory computer-readable storage medium according to claim 12, wherein
the reading unit reads the original placed on an original table, and
in a case where the original region extracted by the extraction unit is inclined relative to a reference direction of the original table, the determination unit determines the processing region by using the second parameter according to the inclination of the original region.

15. The non-transitory computer-readable storage medium according to claim 12, wherein the reading unit carries out pre-scanning to read the original at a start of processing, and main scanning to read the original.

16. The non-transitory computer-readable storage medium according to claim 15, wherein a resolution in a case of carrying out the pre-scanning is lower than a resolution in a case of carrying out the main scanning.

17. The non-transitory computer-readable storage medium according to claim 15, wherein the main scanning is carried out after determination of the processing region by the determination unit.

18. The non-transitory computer-readable storage medium according to claim 15, wherein the main scanning is carried out before determination of the processing region by the determination unit.

19. The non-transitory computer-readable storage medium according to claim 12, wherein the inclusive relation is determined by comparing a length of a short side of the original region extracted by the extraction unit to a length of a long side of the original region extracted by the extraction unit.

20. The non-transitory computer-readable storage medium according to claim 12, wherein the inclusive relation is determined by comparing areas of two original region candidates extracted by the extraction unit.

21. The non-transitory computer-readable storage medium according to claim 12, wherein the reading unit is capable of reading images on a plurality of the originals.

* * * * *